(12) United States Patent
Deferme

(10) Patent No.: US 12,442,430 B2
(45) Date of Patent: Oct. 14, 2025

(54) DAMPER WITH BASE LINE VALVE

(71) Applicant: ADVANCED SUSPENSION TECHNOLOGY LLC, Northville, MI (US)

(72) Inventor: Stefan Deferme, Heusden-Zolder (BE)

(73) Assignee: Advanced Suspension Technology LLC, Northville, MI (US)

( * ) Notice: Subject to any disclaimer, the term of this patent is extended or adjusted under 35 U.S.C. 154(b) by 417 days.

(21) Appl. No.: 18/301,452

(22) Filed: Apr. 17, 2023

(65) Prior Publication Data

US 2024/0344582 A1 Oct. 17, 2024

(51) Int. Cl.

| | |
|---|---|
| *F16F 9/34* | (2006.01) |
| *F16F 9/19* | (2006.01) |
| *F16F 9/516* | (2006.01) |
| *F16K 15/02* | (2006.01) |
| *B60G 13/08* | (2006.01) |
| *B60G 17/08* | (2006.01) |

(52) U.S. Cl.
CPC ............... *F16F 9/34* (2013.01); *F16F 9/19* (2013.01); *F16F 9/516* (2013.01); *F16K 15/026* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/11* (2013.01); *B60G 2800/162* (2013.01); *F16F 2222/12* (2013.01); *F16F 2228/066* (2013.01); *F16F 2232/08* (2013.01)

(58) Field of Classification Search
CPC ...... F16F 9/19; F16F 9/34; F16F 9/516; F16F 2222/12; F16F 2228/066; F16F 2232/08; F16K 15/026; B60G 13/08; B60G 17/08; B60G 2202/24; B60G 2206/41; B60G 2500/11; B60G 2800/162
USPC ......... 188/322.13, 322.14, 322.2; 137/489.5, 137/490, 491, 493.2, 493.3, 493.6
See application file for complete search history.

(56) References Cited

U.S. PATENT DOCUMENTS 3,003,595 A * 10/1961 Patriquin ................. F16F 9/486
188/289
3,194,262 A 7/1965 Hamilton et al.
(Continued)

FOREIGN PATENT DOCUMENTS

| CN | 107091295 A | 8/2017 |
|---|---|---|
| CN | 214008176 U | 8/2021 |

(Continued)

*Primary Examiner* — Christopher P Schwartz
(74) *Attorney, Agent, or Firm* — Harness, Dickey & Pierce, P.L.C.

(57) ABSTRACT

A damper including a tube, a piston, and a base line valve. The base line valve arranged in fluid communication with at least one of a first and second working chamber of the tube. The base line valve includes a housing, a plug slidably disposed in the housing along a valve axis between open and closed positions, and a spring. The plug includes a plug nose extending through an opening of the housing. The plug nose includes a first annular surface and a second annular surface. The first annular surface being sealingly engaged with a seat of the housing when the plug is in the closed position. The second annular surface being positioned radially inward of the seat by a first dimension when the plug is in the closed position and by a second dimension greater than the first dimension when the plug is in the open position.

20 Claims, 7 Drawing Sheets

(56) References Cited

U.S. PATENT DOCUMENTS

| | | | | |
|---|---|---|---|---|
| 4,109,767 | A * | 8/1978 | Nandyal | F16F 9/34 |
| | | | | 188/315 |
| 5,662,046 | A * | 9/1997 | Wright | F16F 9/512 |
| | | | | 105/198.3 |
| 5,797,594 | A | 8/1998 | Sekine et al. | |
| 8,770,363 | B2 | 7/2014 | Sonsterod et al. | |
| 8,813,923 | B2 | 8/2014 | Lun | |
| 10,421,330 | B2 * | 9/2019 | Jeong | B60G 17/019 |
| 11,084,350 | B2 * | 8/2021 | Birch | B60G 15/06 |
| 12,031,604 | B2 * | 7/2024 | Smeljanskij | F16F 9/34 |
| 2005/0061591 | A1 | 3/2005 | Deferme | |
| 2010/0300822 | A1 * | 12/2010 | Vannucci | F16F 9/342 |
| | | | | 188/322.13 |
| 2011/0187065 | A1 * | 8/2011 | Van Der Knaap | B60G 17/016 |
| | | | | 280/5.507 |
| 2015/0284048 | A1 | 10/2015 | Barefoot | |
| 2017/0002931 | A1 | 1/2017 | Shu et al. | |

FOREIGN PATENT DOCUMENTS

| | | |
|---|---|---|
| DE | 1580582 A1 | 10/1970 |
| EP | 1906046 A1 | 4/2008 |
| GB | 2090644 A | 7/1982 |
| JP | 2011231882 A | 11/2011 |
| JP | 5080040 B2 | 11/2012 |
| JP | 5097732 B2 | 12/2012 |
| JP | 2016070429 A | 5/2016 |
| WO | WO-2019000646 A1 | 1/2019 |

* cited by examiner

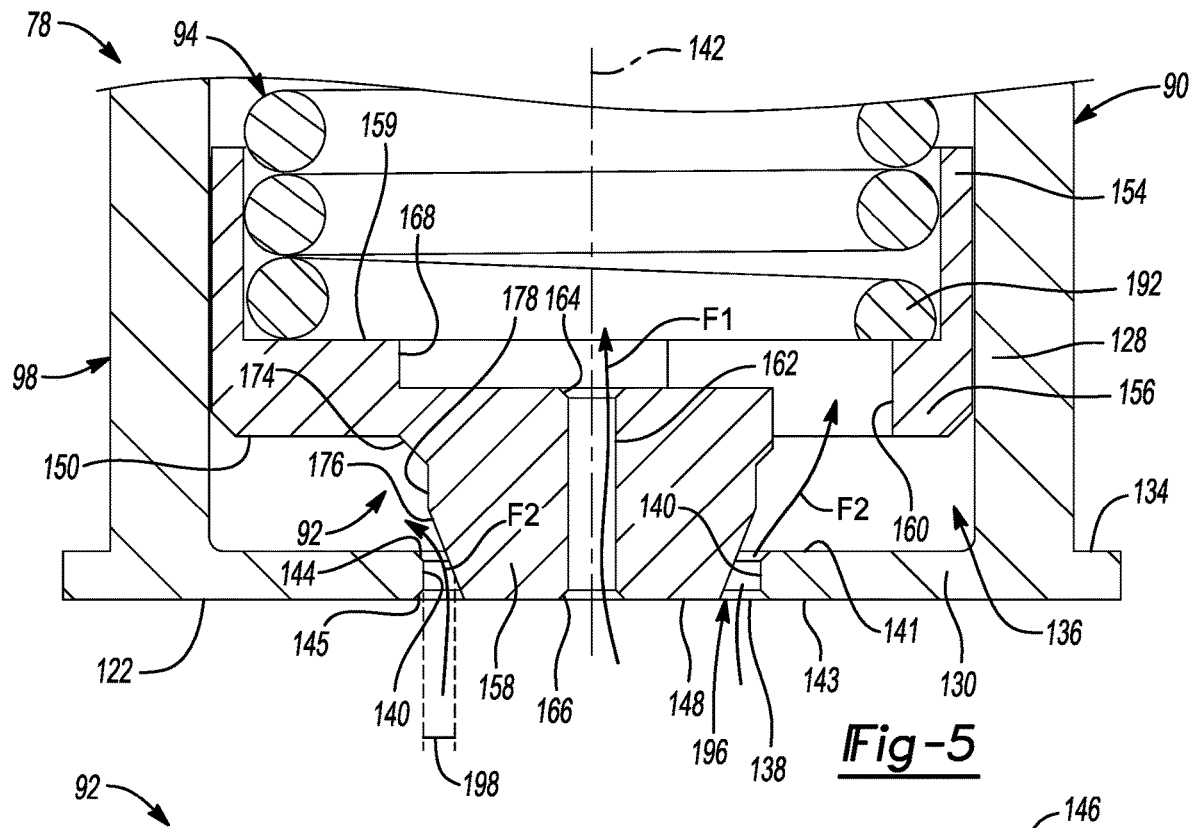
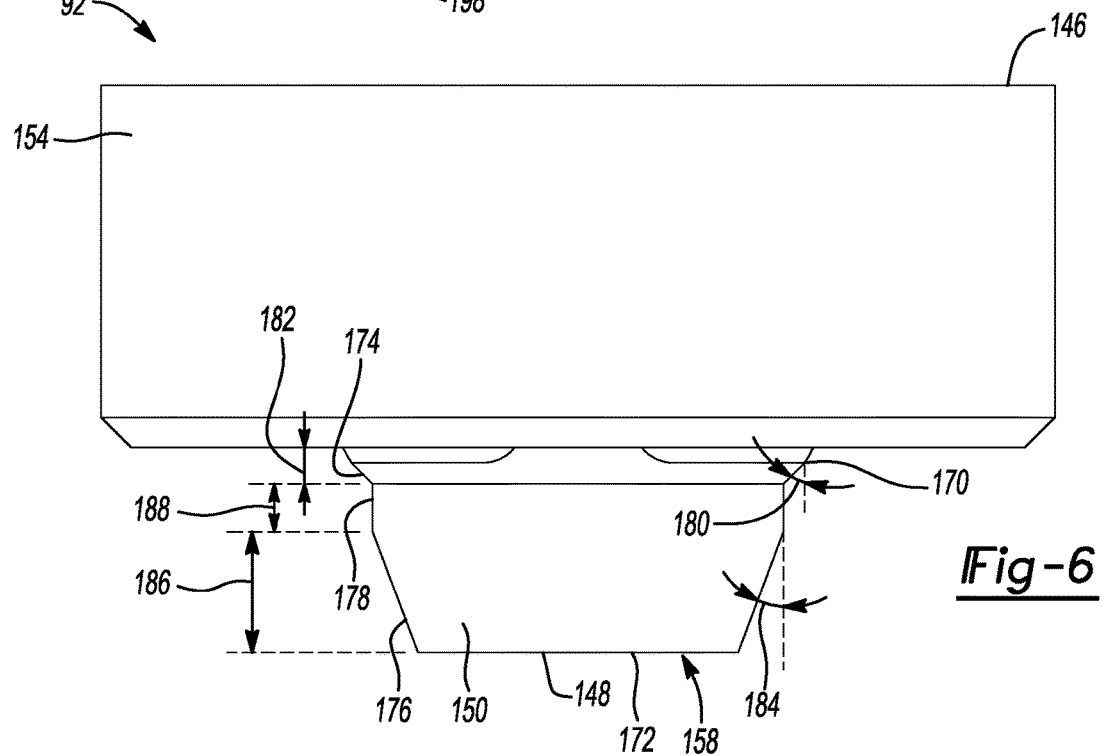

DAMPER WITH BASE LINE VALVE

FIELD

The present disclosure relates to dampers. More particularly, the present disclosure related to dampers with a base line valve.

BACKGROUND

This section provides background information related to the present disclosure which is not necessarily prior art.

Vehicles generally include dampers that are used in conjunction with suspension systems to absorb vibrations and bumps during driving. In order to absorb vibration and bumps, dampers are generally connected between a body and the suspension system of the vehicle. A piston is located within the damper and separates a first working chamber and a second working chamber. The piston is connected to the vehicle body or the suspension of the vehicle through a piston rod.

Dampers typically include one or more valves that control fluid flow through the damper. For example, fluid flow fluid may be controlled between the first and second working chambers during extension and compression motions of the piston and piston rod. In another example, fluid flow may be controlled between the first working chamber or second working chamber and an accumulator of the damper. Traditional dampers depend on a spring of the valve, and more specifically a spring rate of the spring, to alter characteristics of the valve. It is especially challenging to alter the spring rate of the spring to a desired characteristic. For example, altering the spring rate of the spring may involve changing a physical dimension (e.g., diameter, length) of the spring. The physical dimension of the spring is often limited by packaging constraints. Additionally, changing the physical dimension of the spring introduces build variations during manufacture of the valves.

SUMMARY

This section provides a general summary of the disclosure, and is not a comprehensive disclosure of its full scope or all of its features.

In accordance with one aspect of the present disclosure, a damper is provided. The damper includes a tube, a piston, and a base line valve. The tube extends longitudinally between a first tube end and a second tube end. The piston is slidably disposed within the tube and defines a first working chamber and a second working chamber. The base line valve is arranged in fluid communication with at least one of the first working chamber and the second working chamber. The base line valve includes a valve housing, a plug positioned within the valve housing and slidably disposed along a valve axis between open and closed positions, and a spring urging the plug toward the closed position. The plug includes a plug nose extending through an opening of the valve housing. The plug nose includes a first annular surface and a second annular surface being tapered in shape. The first annular surface of the plug nose is sealingly engaged with a seat of the valve housing to close the opening of the valve housing when the plug is in the closed position. The second annular surface of the plug nose is positioned at least partially outside the valve housing and positioned radially inward of the seat by a first dimension when the plug is in the closed position. The second annular surface is positioned radially inward of the seat by a second dimension greater than the first dimension when the plug is in the open position.

In accordance with another aspect of the present disclosure, the base line valve includes an annular aperture that is formed between the plug nose and a cylindrical wall of the opening of the valve housing when the base line valve is in the open position.

In accordance with another aspect of the present disclosure, the second annular surface controls a flow rate of fluid passing through the annular aperture.

In accordance with another aspect of the present disclosure, the plug nose includes a third annular surface that is axially positioned between the first and second annular surfaces and is cylindrical in shape.

In accordance with another aspect of the present disclosure, the plug nose includes a plug nose passageway that extends through the plug nose along the valve axis. The plug nose passageway is arranged in fluid communication with at least one of the first working chamber and a second working chamber.

In accordance with another aspect of the present disclosure, the plug nose passageway remains open regardless of the plug being in the open position or the closed position.

In accordance with another aspect of the present disclosure, the damper includes an accumulator that is arranged in fluid communication with at least one of the first and second working chambers via the base line valve.

In accordance with another aspect of the present disclosure, the first annular surface is disposed annularly about a first nose end of the plug nose and the first nose end is positioned adjacent to the spring. The second annular surface is disposed annularly about a second nose end of the plug nose and the second nose end is positioned opposite to the first nose end.

In accordance with another aspect of the present disclosure, the second annular surface has a second angle ranging from about 5 degrees to about 45 degrees relative to the valve axis.

In accordance with another aspect of the present disclosure, the second annular surface has a curved cross-sectional shape.

In accordance with another aspect of the present disclosure, the second annular surface has a conical or frustoconical shape.

In accordance with yet another aspect of the present disclosure, another damper is provided. The damper includes a tube, a piston, and a base line valve. The tube extends longitudinally between a first tube end and a second tube end. The piston is slidably disposed within the tube and defines a first working chamber and a second working chamber. The base line valve is arranged in fluid communication with at least one of the first working chamber and the second working chamber. The base line valve includes a valve housing, a plug positioned within the valve housing and slidably disposed along a valve axis between open and closed positions, and a spring urging the plug toward the closed position. The plug includes a plug nose extending through an opening of the valve housing. The opening of the valve housing has a cylindrical wall. The plug nose includes a first annular surface with, a second annular surface, and a third annular surface positioned axially between the first and second annular surfaces. The second annular surface is tapered in shape. The first annular surface of the plug nose is sealingly engaged with a seat of the valve housing to close the opening of the valve housing when the plug is in the closed position. The second annular surface of the plug nose is positioned outside of the valve housing when the plug is in the closed position and positioned in the opening of the valve housing when the plug is in the open position. The third annular surface of the plug nose is positioned radially inward of the cylindrical wall of the opening of the valve housing when the plug is in the closed position and positioned inside the valve housing when the plug is in the open position.

In accordance with another aspect of the present disclosure, the base line valve includes an annular aperture that is formed between the plug nose and the cylindrical wall of the opening of the valve housing when the plug is in the open position. The annular aperture has an aperture size that is measured radially between the plug nose and the cylindrical wall.

In accordance with another aspect of the present disclosure, the aperture size is greater when the second annular surface is positioned within the opening than when the third annular surface is positioned within the opening.

In accordance with another aspect of the present disclosure, a flow rate of fluid passing through the annular aperture increases as the second annular surface of the plug nose moves through the opening of the valve housing during movement of the plug from the closed position to the open position.

In accordance with another aspect of the present disclosure, the second annular surface control a flow rate of fluid passing through the annular aperture.

In accordance with another aspect of the present disclosure, the second annular surface has a curved cross-sectional shape.

In accordance with another aspect of the present disclosure, the second annular surface has a second angle ranging from about 5 degrees to about 45 degrees relative to the valve axis.

In accordance with another aspect of the present disclosure, the plug nose includes a plug nose passageway that extends through the plug nose along the valve axis. The plug nose passageway is arranged in fluid communication with at least one of the first working chamber and a second working chamber. The plug nose passageway remains open regardless of the plug being in the open position or the closed position.

In accordance with yet another aspect of the present disclosure, a kit for a damper is provided. The kit includes a tube, a piston, a first base line valve, and a second base line valve. The tube extends longitudinally between a first tube end and a second tube end. The piston is slidably disposed within the tube and defines a first working chamber and a second working chamber. The first base line valve is arranged in fluid communication with one of the first working chamber and the second working chamber. The first base line valve includes a first valve housing, a first plug positioned within the first valve housing and slidably disposed along a first valve axis between first open and first closed positions, and a first spring urging the first plug toward the first closed position. The first plug includes a first plug nose extending through a first opening of the first valve housing. The first plug nose includes a first annular surface with a first tapered shape. The first tapered shape of the first annular surface controls a first flow rate of fluid entering the first valve housing when a first pressure is exerted on the first plug nose. The second base line valve arranged in fluid communication with the other of the first working chamber and a second working chamber. The second base line valve includes a second valve housing, a second plug positioned within the second valve housing and slidably disposed along a second valve axis between second open and first closed positions, and a second spring urging the second plug toward the closed position. The second plug includes a second plug nose extending through a second opening of the second valve housing. The second plug nose includes a second annular surface with a second tapered shape. The second tapered shape of the second annular surface controls a second flow rate of fluid entering the second valve housing when a second pressure is exerted on the second plug nose. The second tapered shape of the second annular surface is different than the first tapered shape of the first annular surface and thereby, the second flow rate of fluid entering the second base line valve is different than the first flow rate of fluid entering the first base line valve. The damper includes one of the first base line valve and the second base line valve.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

FIG. 5 is a side cross-sectional view of the exemplary base line valve shown in FIG. 2, where the base line valve is in an open position;

FIG. 6 is a side view of an exemplary plug of the exemplary base line valve shown in FIG. 2;

Corresponding reference numerals indicate corresponding parts throughout the several views of the drawings.

DETAILED DESCRIPTION

Figure 1:
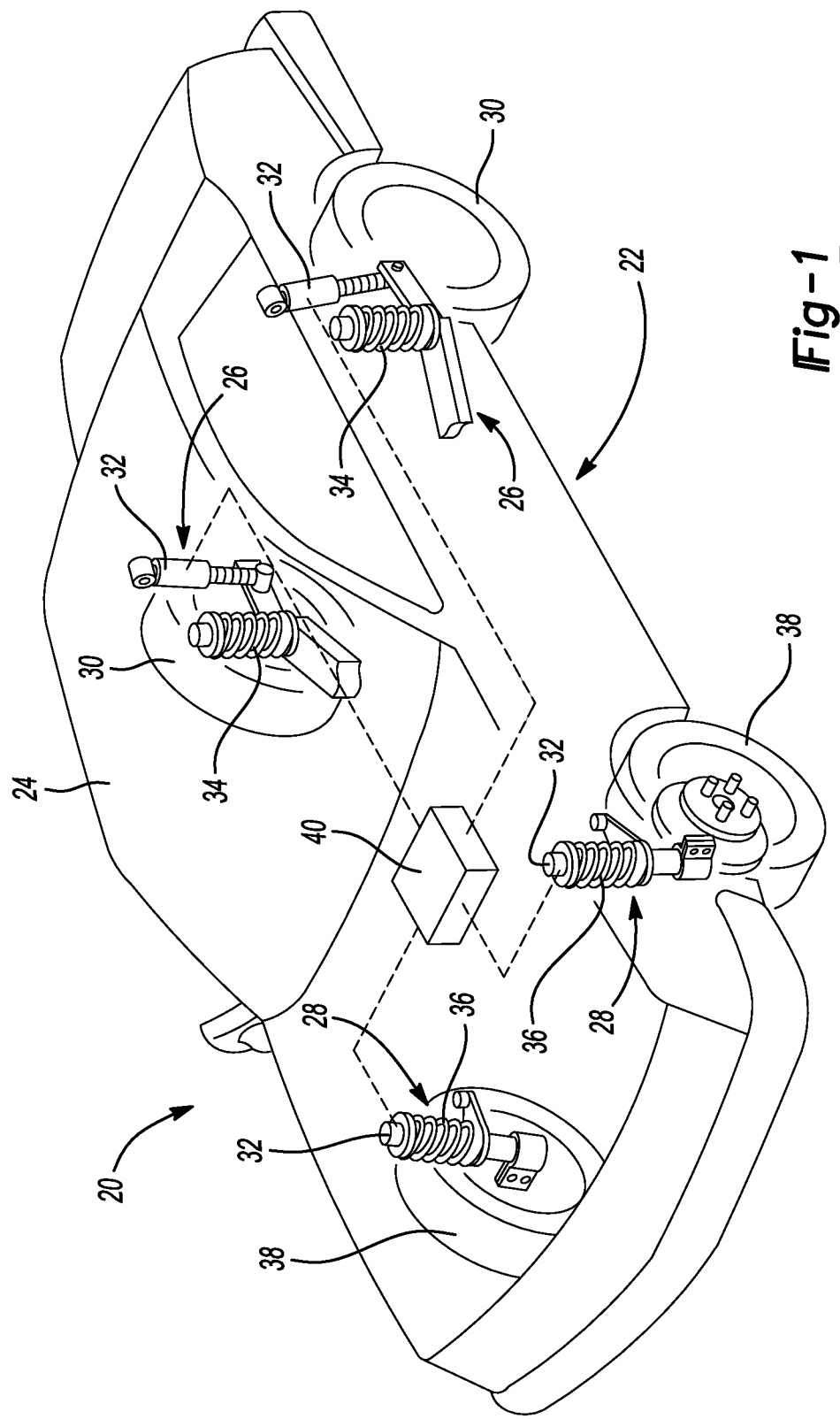
FIG. 1 is an illustration of a vehicle incorporating a suspension system constructed in accordance with the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an exemplary vehicle 20 incorporating a suspension system 22 in accordance with the present disclosure. The vehicle 20 may be driven by an internal combustion engine, an electric motor, a hybrid/electric powertrain, or equivalents thereof. The vehicle 20 includes a body 24. The suspension system 22 of the vehicle 20 includes a rear suspension 26 and a front suspension 28. The rear suspension 26 includes a rear axle assembly (not shown) adapted to operatively support a pair of rear wheels 30. The rear axle assembly is operatively connected to the body 24 by means of a pair of dampers 32 and a pair of helical coil springs 34. Similarly, the front suspension 28 includes a front axle assembly (not shown) that supports a pair of front wheels 38. The front axle assembly is connected to the body 24 by means of another pair of the dampers 32 and a pair of helical coil springs 36. In an alternative embodiment, the vehicle 20 may include an independent suspension unit (not shown) for each of the four corners instead of front and rear axle assemblies.

The dampers 32 of the suspension system 22 serve to dampen the relative movement of the unsprung portion (i.e., the front and rear suspensions 28, 26 and the front and rear wheels 38, 30) and the sprung portion (i.e., the body 24) of the vehicle 20. While the vehicle 20 has been depicted as a passenger car, the dampers 32 may be used with other types of vehicles. Examples of such vehicles include buses, trucks, off-road vehicles, three-wheelers, ATVs, motor bikes, and so forth. Furthermore, the term "damper" as used herein will refer to dampers in general and will include shock absorbers, McPherson struts, and semi-active and active suspensions.

The dampers 32 may be configured as passive, semi-active or active dampers. In semi-active and active configurations, an electronic controller 40 may be electrically connected to the dampers 32. The electronic controller 40 is used for controlling the operation of each of the dampers 32 to provide appropriate damping characteristics resulting from movements of the body 24 of the vehicle 20. The electronic controller 40 may independently control each of the dampers 32 to a desired damping level. The electronic controller 40 may be electrically connected to the dampers 32 via wired connections, wireless connections, or a combination thereof.

The electronic controller 40 may independently adjust the damping level, damping rate, or damping characteristics of each of the dampers 32 to optimize the ride performance of the vehicle 20. The term "damping level", as used herein, refers to a damping force produced by each of the dampers 32 to counteract compression and/or extension/rebound movements. A higher damping level may correspond to a higher damping force. Similarly, a lower damping level may correspond to a lower damping force. Adjustment of the damping levels is beneficial during braking and turning of the vehicle 20 to counteract brake dive during braking and body roll during turns. In accordance with one embodiment of the present disclosure, the electronic controller 40 processes input signals from one or more sensors (not shown) of the vehicle 20 in order to control the damping level of each of the dampers 32. The sensors may sense one or more parameters of the vehicle 20, such as, but not limited to, displacement, velocity, acceleration, vehicle speed, steering wheel angle, brake pressure, engine torque, engine speed in revolutions per minute (RPM), throttle pedal position, and so forth. The electronic controller 40 may further control the damping level of the dampers 32 based on a driving mode of the vehicle 20. The driving mode may include a sport mode and a comfort mode. A button (not shown) may allow a driver of the vehicle 20 to choose the driving mode of the vehicle 20. The electronic controller 40 may receive input signals based on an actuation of the button and control the dampers 32 accordingly.

In accordance with another embodiment of the present disclosure, the electronic controller 40 controls the damping level of each of the dampers 32 based on external road conditions, such as rain, snow, mud, and the like. In a further embodiment, the electronic controller 40 regulates the damping level of each of the dampers 32 based on internal vehicle conditions, such as a fuel level, occupancy of the vehicle, load, and so forth.

While the present disclosure is being illustrated with a single electronic controller 40, it is within the scope of the present disclosure to utilize a dedicated electronic controller for each of the dampers 32. The dedicated electronic controller may be located onboard each respective damper 32. Alternatively, the electronic controller 40 may be integrated into an Electronic Control Unit (ECU) of the vehicle 20. The electronic controller 40 may include a processor, memory, Input/Output (I/O) interfaces, communication interfaces, and other electrical components. The processor may execute various instructions stored in the memory for carrying out various operations of the electronic controller 40. The electronic controller 40 may receive and transmit signals and data through the I/O interfaces and the communication interfaces. In further embodiments, the electronic controller 40 may include microcontrollers, application-specific integrated circuits (ASICs), field programmable gate arrays (FPGAs), and so forth.

Figure 2:
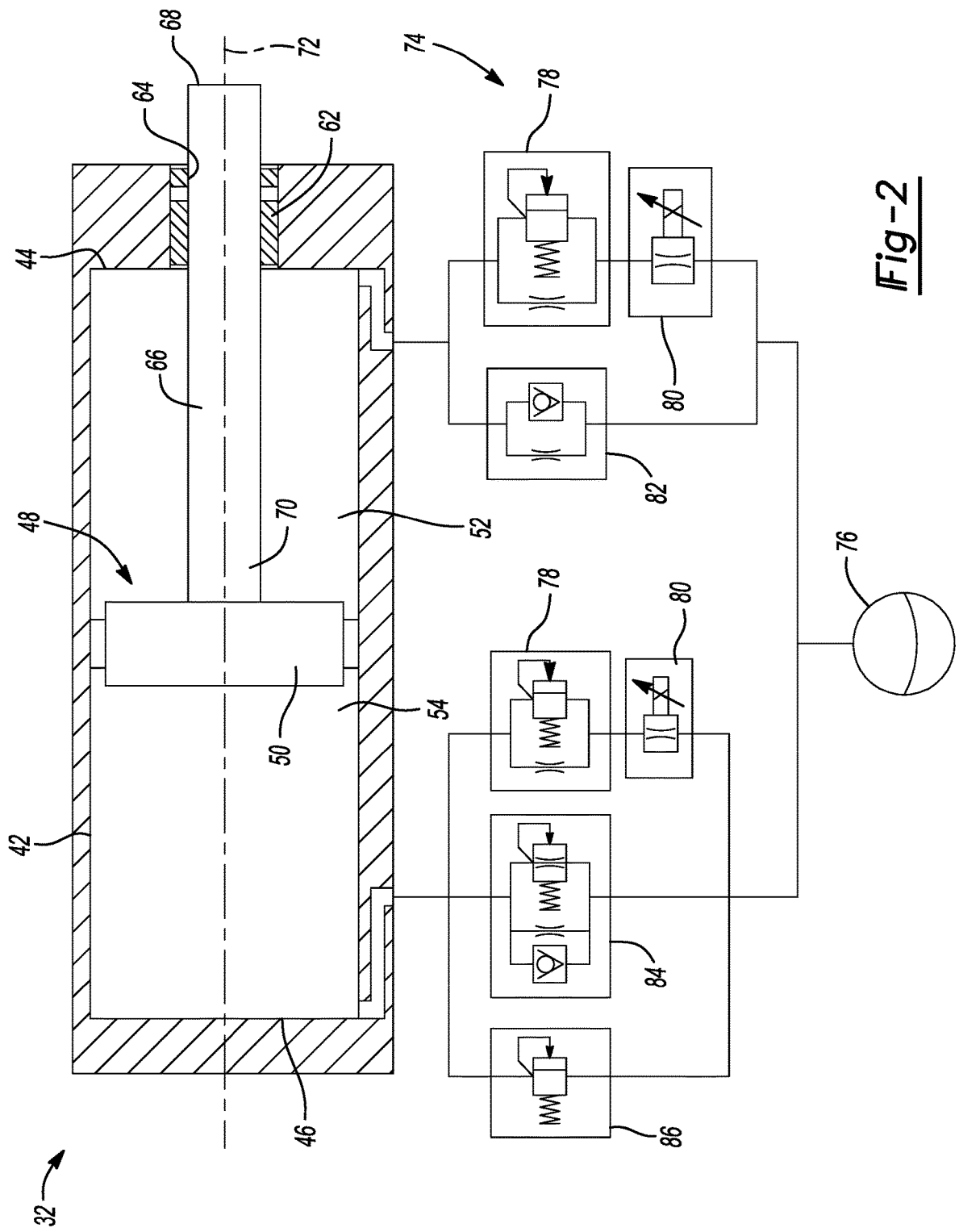
FIG. 2 is a schematic diagram of an exemplary damper constructed in accordance with the present disclosure.

FIG. 2 illustrates an exemplary damper 32, which may be any of the four dampers 32 of the vehicle 20 shown in FIG. 1. The damper 32 may optionally be configured as a continuously variable semi-active suspension system damper 32. The damper 32 contains fluid. By way of example and without limitation, the fluid is hydraulic fluid or oil. The damper 32 includes a tube 42 that extends longitudinally between a first tube end 44 and a second tube end 46. A piston assembly 48 includes a piston 50 slidably disposed within the tube 42. The piston 50 defines a first working chamber 52 and a second working chamber 54 within the tube 42. The first working chamber 52 is positioned longitudinally between the piston 50 and the first tube end 44 and acts as a rebound chamber during movement of the piston 50. The second working chamber 54 is positioned longitudinally between the piston 50 and the second tube end 46 and acts as a compression chamber.

The damper 32 includes a piston rod guide 62. The piston rod guide 62 includes a piston rod passage 64. A piston rod 66 extends longitudinally between a first piston rod end 68 and a second piston rod end 70 along a longitudinal axis 72, through the piston rod passage 64 of the piston rod guide 62. The second piston rod end 70 is attached to the piston 50 and the first piston rod end 68 is configured to attach to a suspension component of the vehicle 20.

The damper 32 includes a valve assembly 74 and an accumulator 76. The valve assembly 74 includes a first one of a base line valve 78, a second one of the base line valve 78, a first one of an electronic control valve 80 (e.g., first electronic control valve), a second one of the electronic control valve 80 (e.g., second electronic control valve), a first check valve 82, a second check valve 84, and a pressure release valve 86. The first one of the base line valve 78 is arranged in fluid communication with the first working chamber 52. The second one of the base line valve 78 is arranged in fluid communication with the second working chamber 54. The base line valve 78 will be described in greater detail below.

The first one of the electronic control valve 80 is arranged in fluid communication with the first one of the base line valve 78 and the accumulator 76. The second one of the electronic control valve 80 is arranged in fluid communication with the second one of the base line valve 78 and the accumulator 76. In other words, the accumulator 76 is arranged in fluid communication with first working chamber 52 via the first one of the base line valve 78 and the first one of the electronic control valve 80. The accumulator 76 is arranged in fluid communication with second working chamber 54 via the second one of the base line valve 78 and the second one of the electronic control valve 80.

The electronic control valve 80 may be a two-position, solenoid actuated electro-mechanical valve. Alternatively, electronic control valve 80 may be a continuously variable electro-mechanical valve. The electronic controller 40 may regulate the electronic control valves 80 in order to control the damping level of the damper 32. The electronic control valves 80 may be controlled by an input current provided to the solenoid of the electronic control valve 80. The electronic controller 40 generates the input current in order to control the operation and the damping level of the damper 32. The solenoid of the electronic control valves 80 may be connected in electrical communication with the electronic controller 40. Further, the input current may be set to any number of intermediate magnitudes between lower and upper limits, which correspond to least and most restrictive positions (i.e., an open position and a closed position) of the electronic control valves 80. The electronic controller 40 may control the damping force or level by controlling a degree of restriction of the electronic control valves 80. Specifically, the electronic controller 40 may regulate the input currents to vary a restriction of the electronic control valves 80. Sending a low current to the electronic control valves 80 may correspond to low damping ratio or damping level. Similarly, sending a high current to the electronic control valves 80 may correspond to a high damping ratio or damping level.

Figure 3:
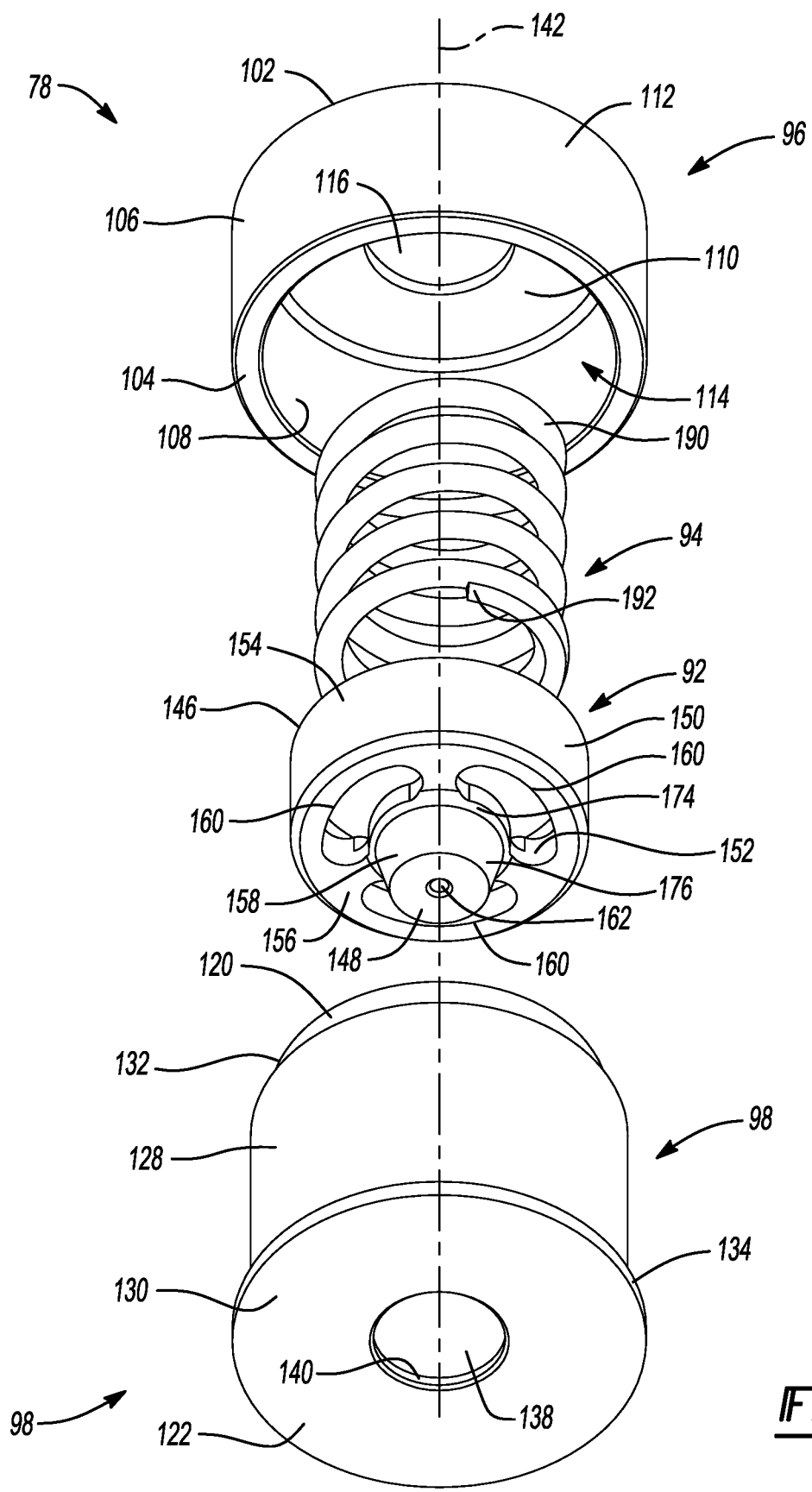
FIG. 3 is an exploded perspective view of an exemplary base line valve of the exemplary damper shown in FIG. 2.
Figure 4:
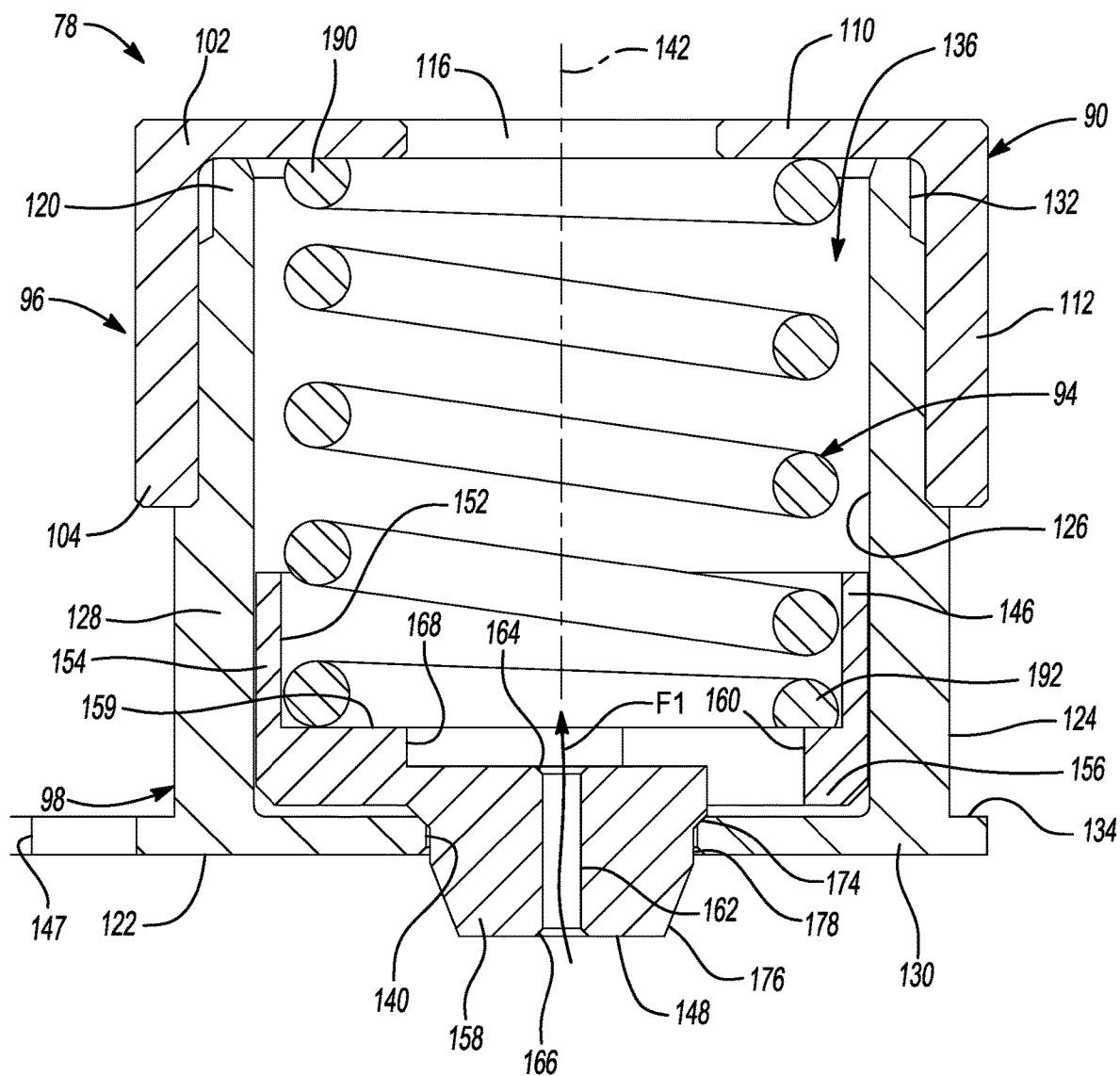
FIG. 4 is a side cross-sectional view of the exemplary base line valve shown in FIG. 2, where the base line valve is in a closed position.

With reference to FIGS. 3-5, the base line valve 78 includes a valve housing 90, a plug 92, and a spring 94. The base line valve 78 is operable in a first valve position or a closed valve position (FIG. 4) and a second valve position or an open valve position (FIG. 5). The base line valve 78 may be operable in any number of intermediate positions between the first and second valve positions. The valve housing 90 includes a valve cap 96 and a valve interface 98. In some configurations, the valve housing 90 may be a single component.

The valve cap 96 extends longitudinally between a first cap end 102 (e.g., first end of the valve housing 90) and a second cap end 104. The valve cap 96 has an outer cap surface 106 and an inner cap surface 108. A top cap wall 110 (e.g., top wall of valve housing 90) is disposed at the first cap end 102. The top cap wall 110 may be formed in a circular shape, or another suitable shape. A cap sidewall 112 extends annularly about the top cap wall 110 and extends longitudinally between the first and second cap ends 102, 104. In other words, the cap sidewall 112 extends between the top cap wall 110 and the second cap end 104. The valve cap 96 has a cylindrical shape. However, the valve cap 96 may be formed in another suitable shape. The top cap wall 110 and the cap sidewall 112 cooperate to define a valve cap recess 114. A first housing opening 116 extends through the top cap wall 110. The first housing opening 116 is arranged in fluid communication with the accumulator 76 and the electronic control valve 80. More specifically, fluid flows from the valve housing 90 to the electronic control valve 80 via the first housing opening 116 and from the electronic control valve 80 to the accumulator 76.

The valve interface 98 extends longitudinally between a first interface end 120 and a second interface end 122 (e.g., second end of the valve housing 90). The valve interface 98 has an outer interface surface 124 and an inner interface surface 126. The valve interface 98 includes an interface sidewall 128 and a bottom interface wall 130 (e.g., bottom wall of valve housing 90). The interface sidewall 128 extends longitudinally between the first and second interface ends 120, 122 and the bottom interface wall 130 is disposed at the second interface end 122. The outer interface surface 124 of the interface sidewall 128 has a sidewall groove 132. The sidewall groove 132 is disposed at the first interface end 120 and extends radially inward. Additionally, a rim 134 is disposed at a circumference of the bottom interface wall 130. The rim 134 protrudes radially outward from the interface sidewall 128.

The valve interface 98 is received in the valve cap recess 114 of the valve cap 96. In other words, the valve cap 96 is disposed over the valve interface 98. The first interface end 120 abuts the inner cap surface 108 of the top cap wall 110 of the valve cap 96. The outer interface surface 124 of the valve interface 98 is coupled to the inner cap surface 108 of the valve cap 96 longitudinally between the sidewall groove 132 of the valve interface 98 and the second cap end 104 of the valve cap 96. The top cap wall 110 of the valve cap 96, the interface sidewall 128 of the valve interface 98, and the bottom interface wall 130 of the valve interface 98 cooperate to define a valve housing cavity 136 inside the valve housing 90.

A second housing opening 138 extends through the bottom interface wall 130 at the second interface end 122. More specifically, the second housing opening 138 is at least partially defined by a cylindrical wall 140. The second housing opening 138 extends between a first wall end 141 and a second wall end 143. The first wall end 141 is positioned adjacent to the valve housing cavity 136 and the second wall end 143 is positioned opposite to the first wall end 141.

A plug seat 144 (e.g., seat) of the valve housing 90 forms another portion of the second housing opening 138 and is positioned adjacent to the first wall end 141 and the cylindrical wall 140. The plug seat 144 may be chamfered, tapered or frustoconical in shape. An additional and optional chamfered surface 145 may be provided at the opposite end of cylindrical wall 140 and adjacent to the second wall end 143. At least one of the first working chamber 52 and the second working chamber 54 is arranged in fluid communication with the valve housing cavity 136 via the second housing opening 138. The second housing opening 138 may be at least partially aligned with the first housing opening 116. In the illustrated example, the second housing opening 138 is aligned with the first housing opening 116 along a valve axis 142 and is positioned opposite to the first housing opening 116.

The plug 92 is slidably disposed within the valve housing cavity 136 and is positioned at the second interface end 122 of the valve interface 98. The plug 92 is movable between a first plug position or a closed position (FIG. 4) and a second plug position or an open position (FIG. 5) along the valve axis 142. The plug 92 may be placed in any number of positions between the first and second plug positions. The plug 92 extends longitudinally between a first plug end 146 and a second plug end 148 and has an outer plug surface 150 and an inner plug surface 152. The plug 92 may include a plug sidewall 154 and a bottom plug wall 156. In one example, the plug 92 may only include the bottom plug wall 156 and not include the plug sidewall 154.

The plug sidewall 154 is disposed at the first plug end 146 and extends annularly about the valve axis 142. The outer plug surface 150 of the plug sidewall 154 is slidably engaged with the inner interface surface 126 of the plug sidewall 154 of the valve interface 98. A plug nose 158 is disposed at the second plug end 148. The bottom plug wall 156 is positioned between the first and second plug ends 146, 148. In other words, the plug sidewall 154 extends between the first plug end 146 and the bottom plug wall 156, and the plug nose 158 extends between the bottom plug wall 156 and the second plug end 148. The plug sidewall 154 and the bottom plug wall 156 cooperate to define a spring seat 159 at the inner plug surface 152.

One or more plug openings 160 extend through the bottom plug wall 156. The one or more plug openings 160 are positioned radially between the plug nose 158 and the plug sidewall 154. In the illustrated example, the one or more plug openings 160 includes three valve openings. Each of the plug openings 160 is formed in an arc shape and are equidistantly spaced apart from each other. However, another suitable number of plug openings 160 may be used and the plug openings 160 may be formed in another suitable configuration.

The plug nose 158 is at least partially aligned with the valve axis 142. The plug nose 158 includes a plug nose passageway 162 that extends longitudinally between a first passageway end 164 and a second passageway end 166. The plug nose passageway 162 remains open regardless of the plug 92 being in the first plug position or the second plug position. The first passageway end 164 is arranged in fluid communication with the valve housing cavity 136. The second passageway end 166 is arranged in fluid communication with at least one of the first working chamber 52 and the second working chamber 54. The plug nose passageway 162 may be at least partially aligned with the valve axis 142. Additionally, the plug 92 includes a valve recess 168 in the inner plug surface 152 of the bottom plug wall 156. The valve recess 168 is arranged in fluid communication with the valve housing cavity 136, the plug nose passageway 162 and the plug openings 160.

With reference to FIGS. 4-7, the plug nose 158 extends longitudinally between a first nose end 170 and a second nose end 172. The first nose end 170 is disposed adjacent to the bottom plug wall 156. The second nose end 172 is disposed at the second plug end 148. The plug nose 158 is tapered in shape such that the radial extent of the plug nose 158 is greatest at the first nose end 170 and lesser at the second nose end 172. In other words, the plug nose 158 has a first circumference has the first nose end 170 and a second circumference that less than the first circumference at the second nose end 172. In the example depicted in FIGS. 4-6, plug nose 158 may have a cone shape or frustoconical shape such that the plug nose 158 generally extends radially inward from the first nose end 170 to the second nose end 172. The outer plug surface 150 of the plug nose 158 may include a first annular surface 174 (e.g., first frustoconical surface), a second annular surface 176 (e.g., second frustoconical surface), and a third annular surface 178 (e.g., third cylindrical surface). In one example shown in FIG. 3, the plug nose 158 includes the first annular surface 174 and the second annular surface 176. In another example shown in FIGS. 4-6, the plug nose 158 includes the first, second, and third annular surfaces 174, 176, 178. In yet another example, the plug nose 158 may only include the first annular surface 174.

The first annular surface 174 is positioned adjacent to the bottom plug wall 156 and extends annularly about the first nose end 170 of the plug nose 158. The first annular surface 174 has a first angle 180 relative to the valve axis 142 and a first distance 182 measured longitudinally along the valve axis 142. The first angle 180 may range from about 5 degrees to about 45 degrees, or another suitable angle. The first angle 180 may be about 25 degrees. The first annular surface 174 of the plug nose 158 is sealingly engaged with the plug seat 144 of the second housing opening 138 when the plug 92 is in the first plug position. The first annular surface 174 of the plug nose 158 is longitudinally spaced from the plug seat 144 when the plug 92 is in the second plug position. More specifically, the plug seat 144 is positioned at the first angle 180 such that the plug seat 144 abuts with the first annular surface 174 of the plug 92 to form a seal.

The second annular surface 176 is positioned at the second plug end 148 of the plug 92 and extends annularly about the second nose end 172 of the plug nose 158.

In the illustrated example shown in FIG. 6, the second annular surface 176 that is tapered and has a linear cross-sectional shape. The second annular surface 176 has a second angle 184 relative to the valve axis 142 and a second distance 186 measured longitudinally along the valve axis 142. The second angle 184 is different from the first angle 180. The second angle 184 may range from about 5 degrees to about 45 degrees, or another suitable angle. More specifically, the second angle 184 may range from about 10 degrees to about 25 degrees.

Figure 7:
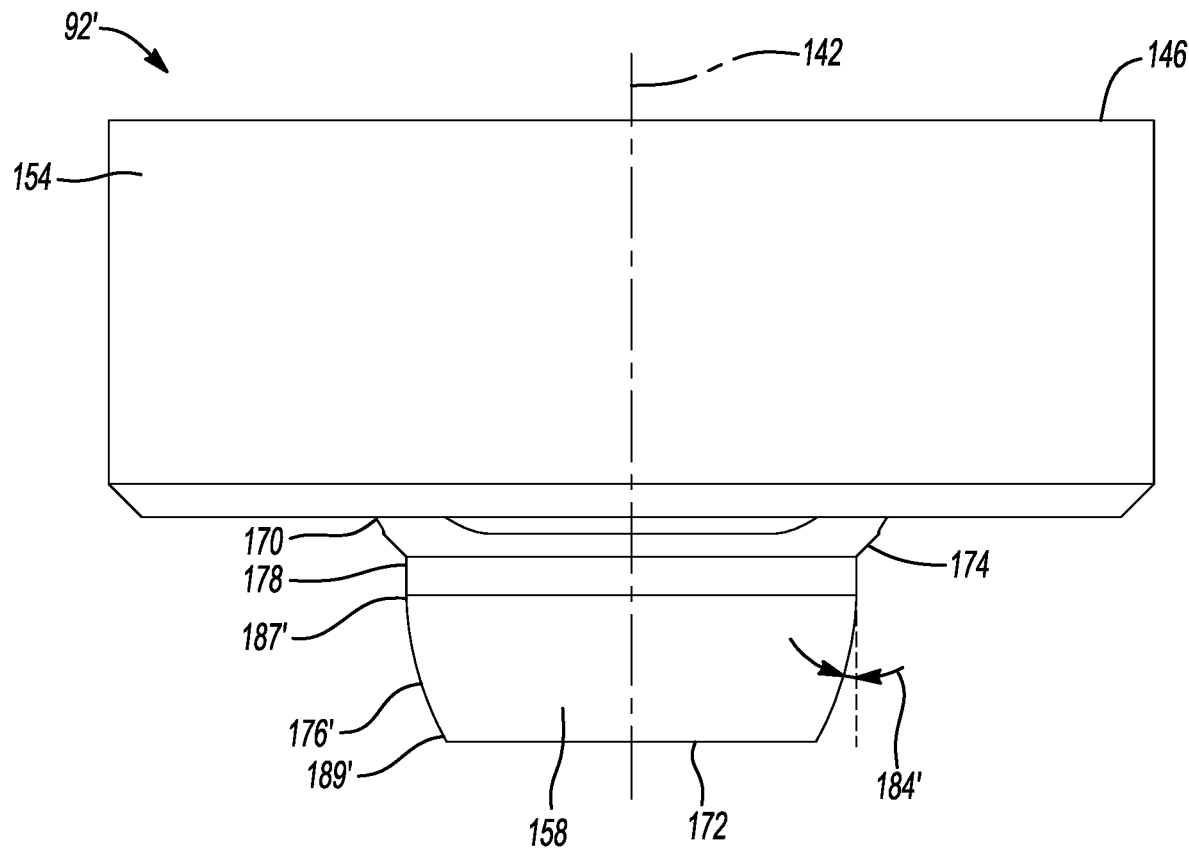
FIG. 7 is a side view of an exemplary plug of another exemplary base line valve constructed in accordance with the present disclosure.

In the illustrated example shown in FIG. 7, another plug 92' is provided. The plug 92' may be the same as the plug 92, except for the plug 92' has a second annular surface 176' that has a curved cross-sectional shape. A tangent angle 184' of the second annular surface 176' relative to the valve axis 142 may range from about 0 degrees to about 45 degrees, or another suitable angle range. In the illustrated example, one tangent angle 184' may be about 0 degrees at a first surface end 187' positioned adjacent to the third annular surface 178 and another tangent angle 184' may be about 45 degrees at a second surface end 189' positioned at the second nose end 172. In other words, the second annular surface 176' gradually curves inward from the first surface end 187' to the second surface end 189' and the tangent angle 184' gradually increases from the first surface end 187' to the second surface end 189'.

Returning to FIGS. 3-6, the second annular surface 176 of the plug nose 158 is positioned outside the valve housing 90 when the plug 92 is in the first plug position. The second annular surface 176 of the plug nose 158 is positioned within the second housing opening 138 when the plug 92 is in the second plug position. When the plug 92 is in the first plug position, the second annular surface 176 of the plug nose 158 is positioned radially inward of the plug seat 144 by a first dimension. When the plug 92 is in the second plug position, the second annular surface 176 of the plug nose 158 is positioned radially inward of the plug seat 144 by a second dimension. The second dimension is greater than the first dimension.

The third annular surface 178 is axially positioned between the first and second annular surfaces 174, 176, and may be cylindrical (e.g., about 0 degrees relative to the valve axis 142) in shape. The third annular surface 178 has a third distance 188 measured longitudinally along the valve axis 142. In one example, the third distance 188 may be about equal to a thickness 147 of the bottom interface wall 130. In another example, the third distance 188 may be less than the thickness 147 of the bottom interface wall 130. The third annular surface 178 is positioned radially inward of the cylindrical wall 140 of the second housing opening 138 when the plug 92 is in the first plug position. In the illustrated example, the third annular surface 178 is radially spaced from the cylindrical wall 140 of the second housing opening 138 when the plug 92 is in the first plug position. However, the third annular surface 178 may abut the cylindrical wall 140 and sealingly engage the second housing opening 138 when the plug is in the first plug position. The third annular surface 178 is disposed within the valve housing cavity 136 when the plug 92 is in the second plug position.

In one example shown in FIG. 3, the plug nose 158 may only include the first annular surface 174 and the second annular surface 176 such that the first and second annular surfaces 174, 176 are positioned directly next to each other, without cylindrically shaped third annular surface 178 therebetween. In another example, the outer plug surface 150 of the plug nose 158 may include only the first annular surface 174. In yet another example, the outer plug surface 150 of the plug nose 158 may be curved as one continuous surface, without discrete surfaces that are angled.

Returning to FIGS. 3-5, the spring 94 is disposed within the valve housing 90 and more specifically, within the valve housing cavity 136. The spring 94 is movable between a first spring position (FIG. 4) and a second spring position (FIG. 5). The spring 94 extends between a first spring end 190 and a second spring end 192. The first spring end 190 abuts the inner cap surface 108 of the top cap wall 100 of the valve cap 96. The second spring end 192 abuts the spring seat 159 of the plug 92. The spring 94 urges the plug 92 toward the first plug position (FIG. 4).

Operation of the base line valve 78 will now be explained in greater detail.

With reference to FIG. 2, a flow path through the base line valve 78 is defined when one or more electronic control valves 80 is opened. During a compression stroke, the piston 50 moves toward the second tube end 46. As such, fluid flows from the second working chamber 54 of the damper 32 to the second one of base line valve 78. Fluid flows from the second one of the base line valve 78, through the second one of the electronic control valve 80, and to the accumulator 76. During an extension stroke, the piston 50 moves toward the first tube end 44. As such, fluid flows from the first working chamber 52 of the damper 32 to the first one of the base line valve 78. Fluid flows from the first one of the base line valve 78, through the first one of the electronic control valve 80, and to the accumulator 76.

With reference to FIGS. 4-5, a flow path F1 is defined when the electronic control valve 80 is opened. Fluid enters the base line valve 78 at the second passageway end 166 of the plug nose passageway 162. Fluid flows from the second passageway end 166, through the plug nose passageway 162 and into the valve housing cavity 136 of the valve housing 90 along flow path F1.

As shown in FIG. 4, the base line valve 78 is in the first valve position. More specifically, the plug 92 of the base line valve 78 is in the first plug position and the spring 94 is in the first spring position. The valve housing cavity 136 has a lower pressure than a pressure created by the flow path F1 at the second plug end 148 of the plug 92. The pressure at the second plug end 148 pushes against the plug nose 158 and the spring 94 counteracts the pressure such that the base line valve 78 remains in the first valve position. Accordingly, the first annular surface 174 of the plug nose 158 is sealingly engaged with the plug seat 144 of the second housing opening 138 of the valve interface 98 and closes the second housing opening 138. The second annular surface 176 of the plug nose 158 is positioned below the second housing opening 138 (e.g., outside the valve housing 90) and the third annular surface 178 of the plug nose 158 is positioned radially inward of the second housing opening 138.

When the pressure at the second plug end 148 exceeds a pressure threshold, the spring 94 is no longer able to counteract the pressure against the plug nose 158 and the base line valve 78 moves out of the first valve position and toward the second valve position. More specifically, the first annular surface 174 of the plug nose 158 lifts from the plug seat 144 of the second housing opening 138 along the valve axis 142 and fluid begins to enter the valve housing cavity 136 along flow path F2. Thereby, the plug 92 moves from the first plug position toward the second plug position. Fluid flows through the second housing opening 138, through at least one of the plug openings 160, and into the valve housing cavity 136 along flow path F2.

As the plug nose 158 lifts (moves toward the first cap end 102 along the valve axis 142) from the second housing opening 138, an annular aperture 196 is formed annularly about the plug nose 158. The annular aperture 196 extends radially between the plug nose 158 and the cylindrical wall 140 of the second housing opening 138. The annular aperture 196 has an aperture size 198 measured radially between the plug nose 158 and the cylindrical wall 140 of the second housing opening 138.

When the plug nose 158 begins to lift from the second housing opening 138, the third annular surface 178 of the plug nose 158 is positioned within the second housing opening 138. As such, the third annular surface 178 limits flow along path F2. As the pressure acting on plug nose 158 continues to increase, the plug 92 continues to translate along the valve axis 142 until the second annular surface 176 of the plug nose 158 is positioned within the second housing opening 138, thereby increasing the aperture size 198 of the annular aperture 196 based on the shape of the second annular surface 176. In other words, the aperture size 198 is greater when the second annular surface 176 is positioned within the second housing opening 138 than when the third annular surface 178 is positioned within the second housing opening 138.

The pressure in the valve housing cavity 136 begins to increase and the plug nose 158 continues to move toward the first cap end 102 of the valve cap 96 along the valve axis 142. As the plug nose 158 moves toward the first cap end 102 along the valve axis 142, the spring seat 159 pushes against the spring 94 and the spring 94 thereby is compressed between the top cap wall 110 of the valve cap 96 and the spring seat 159.

Fluid continues to flow along flow path F2 until the pressure within the valve housing cavity 136 is about equal to the pressure at the second plug end 148 of the plug 92. As shown in FIG. 5, the base line valve 78 thereafter moves into the second position. More specifically, the plug 92 of the base line valve 78 moves into the second plug position and the spring 94 moves into the second spring position. The second plug end 148 of the plug 92 is about flush with the second interface end 122 of the valve housing 90.

Figure 8:
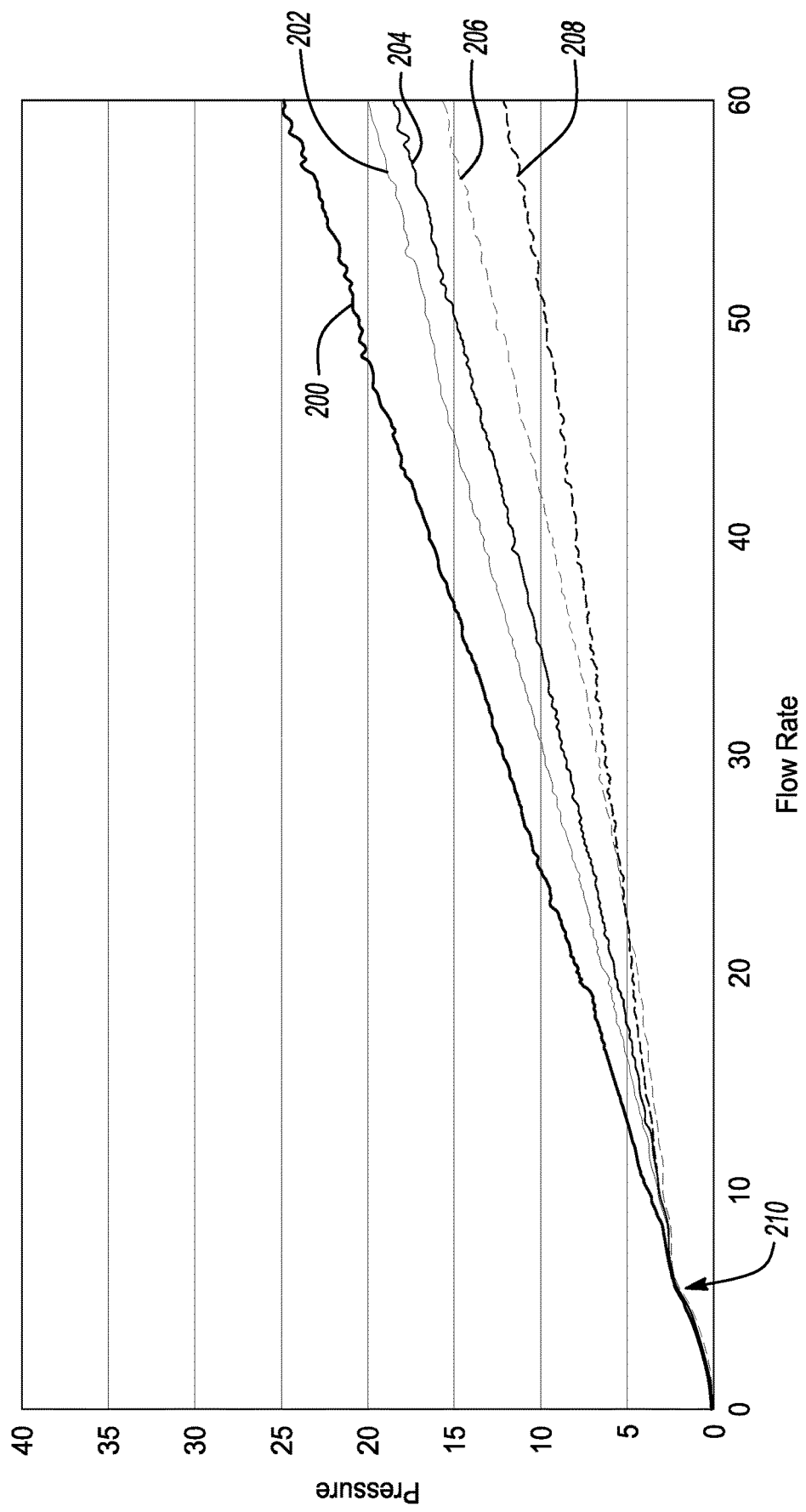
FIG. 8 is a plot illustrating pressure as a function of flow rate for base line valves described herein.

FIG. 8 illustrates a plot in accordance with the present disclosure. The plot represents pressure as a function of flow rate for fluid flowing into five different base line valves 78. The pressure is represented in bars of pressure. The flow rate is represented in liters (l) per minute.

A first flow rate curve 200 is for a first base line valve constructed in accordance with the present disclosure. The first base line valve includes the plug nose 158 having the first annular surface 174, the second annular surface 176, and the third annular surface 178. The first annular surface 174 has the first angle 180 of about 25 degrees. The second annular surface 176 has the second angle 184 of about 10 degrees.

A second flow rate curve 202 is for a second base line valve constructed in accordance with the present disclosure. The second base line valve includes the plug nose 158 having the first annular surface 174 and the second annular surface 176. The first annular surface 174 has the first angle 180 of about 25 degrees. The second annular surface 176 has the second angle 184 of about 10 degrees. The second base line valve is the same or substantially similar to the first base line valve, except the plug nose 158 of the second base line valve does not have a third annular surface 178.

A third flow rate curve 204 is for a third base line valve constructed in accordance with the present disclosure. The third base line valve includes the plug nose 158 having the first annular surface 174 and the second annular surface 176. The first annular surface 174 has the first angle 180 of about 25 degrees. The second annular surface 176 has the second angle 184 of about 15 degrees. The third base line valve is the same or substantially similar to the second base line valve, except the second angle 184 of the third base line valve is 15 degrees and the second angle 184 of the second base line valve is 10 degrees.

A fourth flow rate curve 206 is for a fourth base line valve constructed in accordance with the present disclosure. The fourth base line valve includes the plug nose 158 having the first annular surface 174 and the second annular surface 176. The first annular surface 174 has the first angle 180 of about 25 degrees. The second annular surface 176 has the second angle 184 of about 20 degrees. The fourth base line valve is the same or substantially similar to the second and third base line valves, except the second angle 184 of the fourth base line valve is 20 degrees while the second angle 184 of the second base line valve is 10 degrees and the second angle 184 of the third base line valve is 15 degrees.

A fifth flow rate curve 208 is for a fifth base line valve constructed in accordance with the present disclosure. The fifth base line valve includes the plug nose 158 having the first annular surface 174. The first annular surface 174 has the first angle 180 of about 25 degrees. The fifth base line valve is the same or substantially similar to the second, third, and fourth base line valves, except the fifth base line valve does not include a second annular surface.

The flow rate curves 200, 202, 204, 206, 208 each begin with a parabolic relationship between flow rate and pressure until a blow-off 210. Prior to blow-off 210, the first, second, third, and fourth base line valves are in the first position and fluid flows only through the plug nose passageway 162. At blow-off 210, the first, second, third, and fourth base line valves begin to move from the first position toward the second position. This transition occurs when the pressure exerted on the plug nose 158 of the respective base line valves exceeds the threshold pressure. The threshold pressure is based on a pre-load of the spring 94 and a surface area of the second nose end 172 of the plug nose 158. In the illustrated example, the spring 94 of the respective base line valves is pre-loaded at 10 newtons (N). However, the spring 94 may be pre-loaded at another suitable force and thus, another threshold pressure may be used. Post blow-off 210, the flow rate curves 200, 202, 204, 206, 208 have an approximately linear relationship between flow rate and pressure and fluid flows through the plug nose passageway 162 along flow path F1 and through the annular aperture 196 along flow path F2.

Comparing flow rate curves 200, 202, 204, 206, 208 reveals that the shape and size of the plug nose 158 of the first, second, third, and fourth base line valves influences the flow rate at a given pressure. The first flow rate curve 200 has a notably greater slope than the second flow rate curve 202, the second flow rate curve 202 has a greater slope than the third flow rate curve 204, the third flow rate curve 204 has a greater slope than the fourth flow rate curve 206, and the fourth flow rate curve 206 has a greater slope than the fifth flow rate curve 208 after blow-off 210.

Comparing the first flow rate curve 200 against the second, third, and fourth flow rate curves 202, 204, 206, the first flow rate curve 200 has the largest slope because the first base line valve includes the third annular surface 178. The second, third, and fourth base line valves do not include the third annular surface 178. While the third annular surface 178 of the first base line valve is positioned within the second housing opening 138, the aperture size 198 of the annular aperture 196 is limited to a given aperture size and thereby, restricts the flow rate of fluid through annular aperture 196. In contrast, as the second annular surface 176 of the second, third, and fourth base line valves travel through the second housing opening 138 when the plug 92 moves from the first plug position to the second plug position, the aperture size 198 of the annular aperture 196 increases and allows for a greater flow rate of fluid through the annular aperture 196. The greater the second angle 184 of the second annular surface 176, the greater the flow rate of fluid allowed through the annular aperture 196, and thus, the smaller the slope of the respective flow rate curve. Thereby, the second angle 184 of the second annular surface 176 controls the flow rate of fluid passing through the annular aperture 196.

Therefore, the base line valves 78 of the present disclosure allow for adjustability of flow rate of fluid entering the base line valve 78 by adjusting the shape and size of the plug nose 158 of the base line valves 78. More specifically, a broader plug nose 158 is shown to allow less fluid flow into the second housing opening 138 of the base line valve 78 and thus, results in a greater slope of the flow rate curve. A narrower plug nose 158 is shown to allow greater fluid flow into the second housing opening 138 of the base line valve 78 and thus, results in a lesser slope of the flow rate curve. As such, the second annular surfaces 176 and the third annular surface 178 controls the flow rate of fluid entering the base line valve 78.

As shown, the base line valves 78 can be tuned to have a selected flow rate curve without changing or otherwise altering the spring 94 of the base line valve 78.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A damper, comprising:
   a tube extending longitudinally between a first tube end and a second tube end;
   a piston slidably disposed within the tube and defining a first working chamber and a second working chamber; and
   a base line valve arranged in fluid communication with at least one of the first working chamber and the second working chamber, wherein:
      the base line valve includes a valve housing, a plug positioned within the valve housing and slidably disposed along a valve axis between open and closed positions, and a spring urging the plug toward the closed position, the plug including a plug nose extending through an opening of the valve housing, the plug nose including a first annular surface and a second annular surface, the second annular surface being tapered in shape, and
      the first annular surface of the plug nose being sealingly engaged with a seat of the valve housing to close the opening of the valve housing when the plug is in the closed position, the second annular surface of the plug nose being positioned at least partially outside of the valve housing and positioned radially inward of the seat by a first dimension when the plug is in the closed position, the second annular surface being positioned radially inward of the seat by a second dimension greater than the first dimension when the plug is in the open position.

2. The damper of claim 1, wherein the base line valve includes an annular aperture that is formed between the plug nose and a cylindrical wall of the opening of the valve housing when the base line valve is in the open position.

3. The damper of claim 2, wherein the second annular surface controls a flow rate of fluid passing through the annular aperture.

4. The damper of claim 1, wherein the plug nose includes a third annular surface that is axially positioned between the first and second annular surfaces and is cylindrical in shape.

5. The damper of claim 1, wherein:
   the plug nose includes a plug nose passageway that extends through the plug nose along the valve axis; and
   the plug nose passageway is arranged in fluid communication with at least one of the first working chamber and the second working chamber.

6. The damper of claim 5, wherein the plug nose passageway remains open regardless of the plug being in the open position or the closed position.

7. The damper of claim 1, further comprising an accumulator that is arranged in fluid communication with at least one of the first and second working chambers via the base line valve.

8. The damper of claim 1, wherein:
   the first annular surface is disposed annularly about a first nose end of the plug nose and the first nose end is positioned adjacent to the spring, and
   the second annular surface is disposed annularly about a second nose end of the plug nose and the second nose end is positioned opposite to the first nose end.

9. The damper of claim 1, wherein the second annular surface has a second angle ranging from about 5 degrees to about 45 degrees relative to the valve axis.

10. The damper of claim 1, wherein the second annular surface has a curved cross-sectional shape.

11. The damper of claim 1, wherein the second annular surface has a conical or frustoconical shape.

12. A damper comprising:
   a tube extending longitudinally between a first tube end and a second tube end;
   a piston slidably disposed within the tube and defining a first working chamber and a second working chamber; and
   a base line valve arranged in fluid communication with at least one of the first working chamber and the second working chamber, wherein:
      the base line valve includes a valve housing, a plug positioned within the valve housing and slidably disposed along a valve axis between open and closed positions, and a spring urging the plug toward the closed position, the plug including a plug nose extending through an opening of the valve housing, the opening of the valve housing having a cylindrical wall, the plug nose includes a first annular surface, a second annular surface, and a third annular surface positioned axially between the first and second annular surfaces, the second annular surface is tapered in shape, the first annular surface of the plug nose being sealingly engaged with a seat of the valve housing to close the opening of the valve housing when the plug is in the closed position, the second annular surface of the plug nose being positioned outside of the valve housing when the plug is in the closed position and positioned in the opening of the valve housing when the plug is in the open position, and the third annular surface of the plug nose being positioned radially inward of the cylindrical wall of the opening of the valve housing when the plug is in the closed position and positioned inside the valve housing when the plug is in the open position.

13. The damper of claim 12, wherein:
the base line valve includes an annular aperture that is formed between the plug nose and the cylindrical wall of the opening of the valve housing when the plug is in the open position; and the annular aperture has an aperture size that is measured radially between the plug nose and the cylindrical wall.

14. The damper of claim 13, wherein the aperture size is greater when the second annular surface is positioned within the opening than when the third annular surface is positioned within the opening.

15. The damper of claim 13, wherein a flow rate of fluid passing through the annular aperture increases as the second annular surface of the plug nose moves through the opening of the valve housing during movement of the plug from the closed position to the open position.

16. The damper of claim 13, wherein the second annular surface controls a flow rate of fluid passing through the annular aperture.

17. The damper of claim 12, wherein the second annular surface has a curved cross-sectional shape.

18. The damper of claim 12, wherein the second annular surface has a second angle ranging from about 5 degrees to about 45 degrees relative to the valve axis.

19. The damper of claim 12, wherein:
the plug nose includes a plug nose passageway that extends through the plug nose along the valve axis;
the plug nose passageway is arranged in fluid communication with at least one of the first working chamber and a second working chamber; and the plug nose passageway remains open regardless of the plug being in the open position or the closed position.

20. A kit for a damper, comprising:
a tube extending longitudinally between a first tube end and a second tube end;
a piston slidably disposed within the tube and defining a first working chamber and a second working chamber;
a first base line valve arranged in fluid communication with one of the first working chamber and the second working chamber, wherein:
the first base line valve includes a first valve housing, a first plug positioned within the first valve housing and slidably disposed along a first valve axis between first open and first closed positions, and a first spring urging the first plug toward the first closed position, the first plug including a first plug nose extending through a first opening of the first valve housing, and
the first plug nose including a first annular surface with a first tapered shape, the first tapered shape of the first annular surface controlling a first flow rate of fluid entering the first valve housing when a first pressure is exerted on the first plug nose; and
a second base line valve arranged in fluid communication with the other of the first working chamber and a second working chamber, wherein:
the second base line valve includes a second valve housing, a second plug positioned within the second valve housing and slidably disposed along a second valve axis between second open and second closed positions, and a second spring urging the second plug toward the closed position, the second plug including a second plug nose extending through a second opening of the second valve housing,
the second plug nose including a second annular surface with a second tapered shape relative to the second valve axis, the second tapered shape of the second annular surface controlling a second flow rate of fluid entering the second valve housing when a second pressure is exerted on the second plug nose, and
the second tapered shape of the second annular surface is different than the first tapered shape of the first annular surface and thereby, the second flow rate of fluid entering the second base line valve is different than the first flow rate of fluid entering the first base line valve; and
wherein the damper includes one of the first base line valve and the second base line valve.

* * * * *